Feb. 4, 1958 H. SHEPARD 2,821,989
CONVERTIBLE TOP FOR BOATS
Filed Sept. 10, 1956
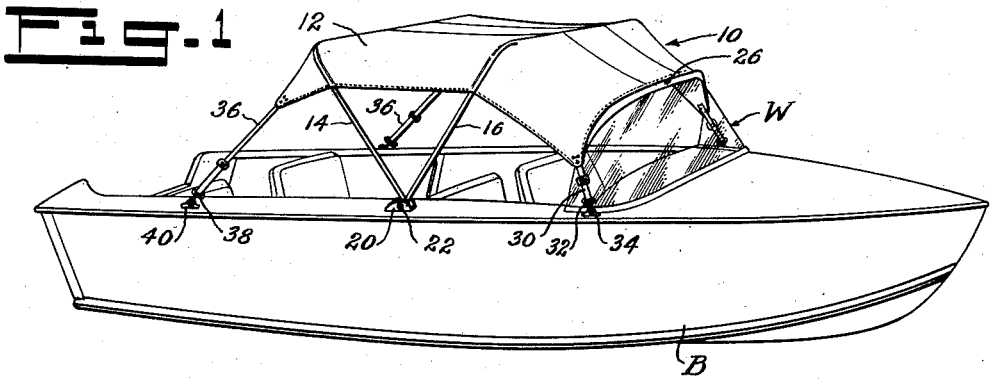
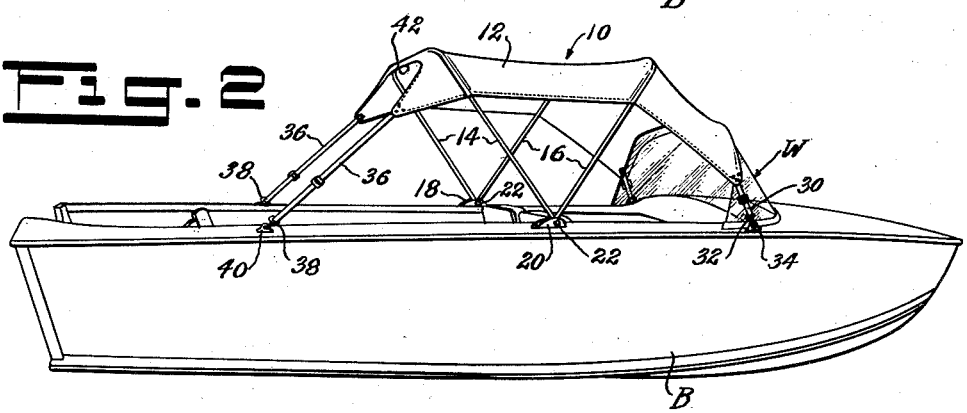
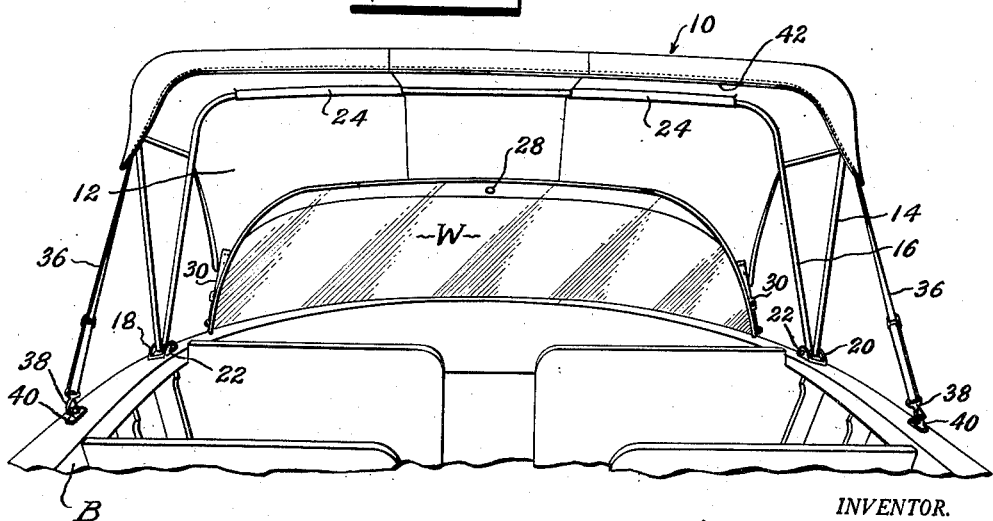
INVENTOR.
HARWOOD SHEPARD
BY
Ernest H. Schmidt Jr.
ATTORNEY

United States Patent Office 2,821,989
Patented Feb. 4, 1958

2,821,989

CONVERTIBLE TOP FOR BOATS

Harwood Shepard, Auburn, N. Y.

Application September 10, 1956, Serial No. 608,730

5 Claims. (Cl. 135—6)

My invention relates to convertible tops and is directed particularly to convertible tops for use on small boats.

Small boats, especially motor driven pleasure boats, are often fitted with wrap-around type windshields for protection against spray and wind. In order to provide overhead protection canvas convertible tops have been made which are attached at one end along a plurality of fastening snaps or studs fitted in the upper molding of the wrap-around windshield and stretched backwardly over the cockpit by an elevating support structure secured to the gunwales of the boat. Such convertible tops had to be made to specifically fit the particular size and shape of wrap-around windshield with which they were used, since it was necessary for the front edge of the canvas top to conform with the shape, size and disposition of the upper edge or molding of the windshield.

It is accordingly the principal object of my invention to provide an improved convertible top for boats which can be used in connection with a wide variety of shapes and sizes of wrap-around windshields.

It is another object of my invention to provide a universal convertible windshield of the character described which is easy to install and adjust, simple and inexpensive in construction and neat-appearing and durable in use.

Further objects, features and advantages of the invention will become apparent from the following description when read with reference to the drawings. In the drawings, wherein like reference numerals denote corresponding parts throughout the several views:

Fig. 1 is an oblique side view of a boat equipped with a universal convertible top embodying the invention, Fig. 2 is a view similar to that of Fig. 1 but taken at a different angle, and Fig. 3 is a rear view of the improved convertible top, the stern section of the boat being broken away.

Referring now to the drawings, the numeral 10 designates the universal convertible top comprising the invention shown fitted on a boat B. The convertible top 10 comprises a fabric top member 12, made of rubberized canvas or other suitable weatherproof material, and a support structure comprised of a pair of tubular U-shaped bows 14, 16 the respective ends of which are pivoted between the sides of a pair of U-shaped mounting brackets 18, 20 by means of transverse pins 22. The underside of the top 12 is sewn with a pair of longitudinal transverse loops 24 through which the front bow 16 extends and which serve for holding said bow in place with respect to the fabric top 12. A similar pair of transverse loops (not illustrated) are provided near the rear end of the underside of the top 12 to hold the rear bow 14.

The front end of the top 12 is cut substantially straight and is fitted at its center with a snap fitting 26 (Fig. 1) which is cooperative with a stud member 28 (Fig. 3) which is secured at the center of the upper molding or upper edge of the wrap-around windshield W. The front corners of the top 12 are each connected to adjustable straps 30 having end snap hooks 32 adapted to be attached in metal strap eyes 34 secured to the boat gunwale at each side of the wrap-around windshield W.

The rear corners of the top 12 are similarly connected to rear adjustable straps 36 having end snap hooks 38 adapted to be attached to strap eyes 40 secured to the boat gunwales at each side near the stern end of the boat. The rear end of the top 12 is made with a cut-out 42, best seen in Fig. 2 to allow additional head room. The sides of the top 12 are cut and sewn to fit around the curved portions of the support bows 14 and 16.

In installing the above-described universal convertible top it is required only to drill and secure the single stud member 28 at the center position on the upper molding or edge of the wrap-around windshield W. The convertible top assembly 10 is then placed in approximate position on the boat and the snap fitting 26 is snapped in place on the stud member 28. The mounting brackets 18, 20 are then set into approximate position and aligned for symmetry with the boat, after which the rear straps 36 are pulled backwardly tightly for locating the rear strap eyes 40. After fastening the rear straps 36, the front straps 30 are pulled downwardly into the position at which wrinkles in the top 12 disappear, after which the front eye straps 34 are secured in place and the front straps attached. Finally, the mounting brackets 18 and 20 are shifted back and forth or sideways until wrinkles in the top are minimized, at which position they are screwed in place on the boat. Because of the construction of the front end of the top 12, and its unique securing means, the convertible top can readily be fitted with a wide variety of shapes and sizes of wrap-around windshield, presenting in each installation a neat and workmanlike appearance.

While I have described a preferred embodiment of my invention, it is to be understood that this disclosure is for the purpose of illustration only and that various omissions, or changes in arrangement of parts, as well as the substitution of equivalent elements for those herein shown and described, may be made without departing from the spirit and scope of the invention as set forth in the appended claims.

I claim:

1. In a universal convertible top for boats having wrap-around type windshields, the combination comprising a flexible fabric top member having a pair of front corners and a pair of rear corners, means for supporting said top member above the cockpit of the boat, means for fastening the front center of said top member to the top center of the wrap-around windshield, the front end of said top member being operative to overlay the upper peripheral edge of the windshield and to overlap and snugly engage upper front portions of the windshield in face-to-face contacting engagement, a pair of adjustable front straps attached at the front corners of said top for adjustably securing the front of said top member to the gunwales of the boat and operative to hold said front end in said overlapping and snugly engaging relation with respect to the windshield, and a pair of adjustable rear straps attached at the rear corners of said top for adjustably securing the rear of said top member to the gunwales of the boat for pulling said top downwardly and rearwardly with respect to the boat and for holding said top taut on said supporting means.

2. The convertible top as defined in claim 1 wherein said top member supporting means comprises a pair of inverted U-shaped tubular bow members having end portions adapted to be secured to the gunwales of the boat.

3. The convertible top defined in claim 2 including a pair of bracket members, corresponding pairs of end portions of each of said bow members being journalled one pair each in said bracket members.

4. The convertible top as defined in claim 1 wherein outer ends of said front straps each have a snap hook adapted for connection with strap eyes fastened to the gunwales of the boat at each side of the windshield.

5. The convertible top as defined in claim 1 wherein said top member fastening means comprises a snap fitting adapted for connection with a stud member in the windshield.

References Cited in the file of this patent

UNITED STATES PATENTS

| | | |
|---|---|---|
| 778,330 | Pond | Dec. 27, 1904 |
| 835,378 | Taylor | Nov. 6, 1906 |
| 1,028,266 | Ormsby | June 4, 1912 |
| 1,533,448 | Noble | Apr. 14, 1925 |
| 2,266,853 | Dabney | Dec. 23, 1941 |
| 2,505,520 | Bills | Apr. 25, 1950 |
| 2,639,751 | Flaherty | May 26, 1953 |
| 2,681,659 | Hrinsin | June 22, 1954 |
| 2,689,579 | Sartori | Sept. 21, 1954 |